(12) United States Patent
Cai et al.

(10) Patent No.: US 11,683,269 B2
(45) Date of Patent: Jun. 20, 2023

(54) DATA FLOW PROCESSING METHOD, ELECTRONIC DEVICE, AND STORAGE MEDIUM

(71) Applicant: Nanning FuLian FuGui Precision Industrial Co., Ltd., Nanning (CN)

(72) Inventors: Ming Cai, Shenzhen (CN); Ai-Jun Shen, Shanghai (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 18 days.

(21) Appl. No.: 17/581,937

(22) Filed: Jan. 23, 2022

(65) Prior Publication Data

US 2022/0239592 A1 Jul. 28, 2022

(30) Foreign Application Priority Data

Jan. 22, 2021 (CN) .......................... 202110087927.3

(51) Int. Cl.
*H04L 45/74* (2022.01)
*H04L 47/2483* (2022.01)
*H04L 47/6295* (2022.01)
*H04L 47/2441* (2022.01)

(52) U.S. Cl.
CPC .......... *H04L 45/74* (2013.01); *H04L 47/2441* (2013.01); *H04L 47/2483* (2013.01); *H04L 47/6295* (2013.01)

(58) Field of Classification Search
None
See application file for complete search history.

(56) References Cited

U.S. PATENT DOCUMENTS

2020/0259755 A1* 8/2020 Wang .................... H04L 49/252
2021/0359931 A1* 11/2021 Wang ..................... H04L 49/25

FOREIGN PATENT DOCUMENTS

CN 107924507 4/2018

OTHER PUBLICATIONS

All-Pairs Shortest Path: Floyd-Warshall Algorithm, Posted by Chiu CC (http://alrightchiu.github.io/SecondRound/author/chiu-cc.html) on Mar. 14, 2016.

* cited by examiner

Primary Examiner — Hong Shao
(74) Attorney, Agent, or Firm — ScienBiziP, P.C.

(57) ABSTRACT

In a data flow processing method, multiple data flow queues are obtained. Each of the multiple data flow queues includes one or more data flow sub-queues. A priority of each of the one or more data flow sub-queues is determined. The multiple data flow queues are integrated to a target data flow queue according to the priority. The target data flow queue is sent to a target switch. The method integrates data flows as far as possible and improves the efficiency of data flow scheduling.

16 Claims, 2 Drawing Sheets

---

S11
Obtain multiple data flow queues, each of the multiple data flow queues including one or more data flow sub-queues S12
Determine a priority of each of the one or more data flow sub-queues S13
Integrate the multiple data flow queues into a target data flow queue according to the priority S14
Send the target data flow queue to a target switch

DATA FLOW PROCESSING METHOD, ELECTRONIC DEVICE, AND STORAGE MEDIUM

FIELD

The present disclosure relates to communication technology, and particularly to a data flow processing method, an electronic device, and a storage medium.

BACKGROUND

Time-Sensitive Networking (TSN) is a set of standards under development by the Time-Sensitive Networking task group of the IEEE 802.1 working group. With TSN, periodic and non-periodic data can be transmitted over the same network, giving standard Ethernet the advantage of deterministic transmission. TSN includes a variety of protocols for handling and scheduling flows of data from different sources. However, different users may submit data flows in a TSN network, and integration of such data flows would be beneficial. At present, the data flows cannot be well integrated, resulting in low efficiency of data flow scheduling.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

The embodiments of the present disclosure provide a data flow processing method, an electronic device, and a computer-readable storage medium. The method can be applied to the electronic device. The electronic device can be a terminal device or a server. The terminal device can be a mobile phone, a tablet computer, a notebook computer, a desktop computer, a personal digital assistant, a wearable device, or other electronic devices. The server can include a central network controller (CNC). The server can be a single server or a server cluster composed of multiple servers.

Figure 1:
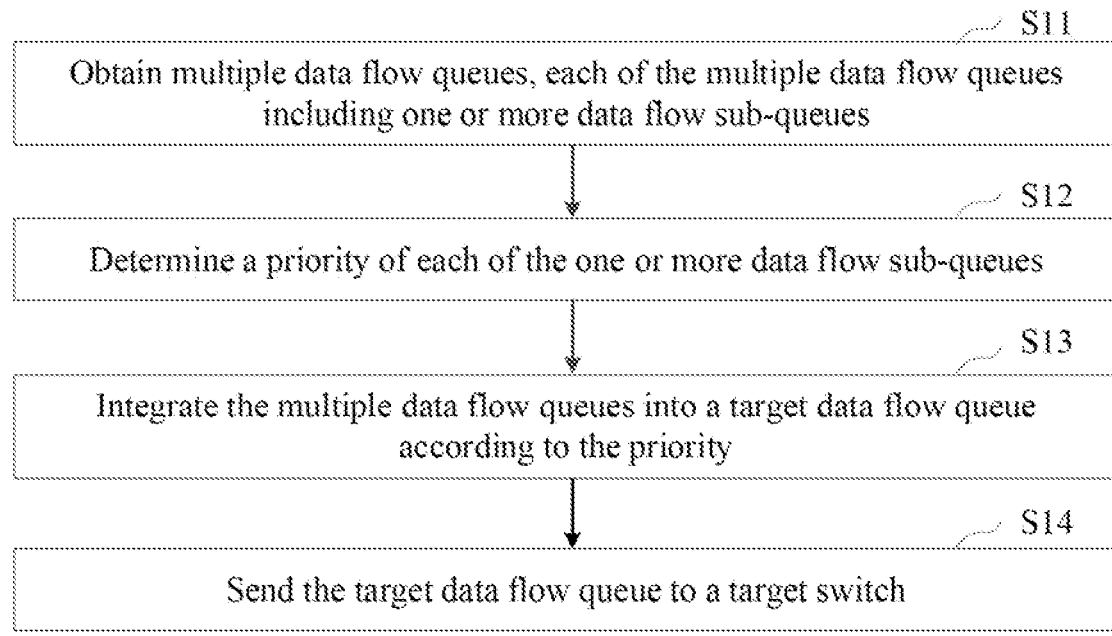
FIG. 1 shows a flow chart of one embodiment of a data flow processing method of the present disclosure.

FIG. 1 shows a flow chart of one embodiment of a data flow processing method of the present disclosure.

Referring to FIG. 1, the data flow processing method may include blocks S11 to S14. The illustrated order of the blocks is illustrative only and the order of the blocks can be changed. Additional blocks can be added or fewer blocks can be utilized without departing from this disclosure.

At block S11, an electronic device obtains multiple data flow queues. Each of the multiple data flow queues includes one or more data flow sub-queues.

The multiple data flow queues may be sent by multiple users. The multiple users may send the multiple data flow queues using Message Queuing Telemetry Transport protocol (MQTT). The data flow sub-queues may include normal flow queues, time-sensitive flow queues, and strictly time-sensitive flow queues. Different data flow sub-queues have different priorities. For example, a strictly time-sensitive flow queue may have a high priority. A time-sensitive flow queue may have a medium priority. A normal flow queue may have a low priority. The priority of the strictly time-sensitive flow queue is greater than the priority of the time-sensitive flow queue, and the priority of the time-sensitive flow queue is greater than the priority of the normal flow queue.

At block S12, the electronic device determines a priority of each of the one or more data flow sub-queues.

In one embodiment, the electronic device may determine the priority of each of the one or more data flow sub-queues according to data frames included in the data flow queues. For example, the electronic device determines the priority according to control fields of the data frames. The control fields contain control information. The control fields may be included in frame headers or frame tails of the data frames.

In one embodiment, determining a priority of each of the one or more data flow sub-queues may include: obtaining a data identifier corresponding to each of the one or more data flow sub-queues; and determining the priority according to the data identifier.

When a user sends a data flow queue to the electronic device using a preset protocol, each data flow sub-queue included in the data flow queue can be marked with a data identifier corresponding to a priority of the data flow sub-queue. According to the data identifier, the priority of the data flow sub-queue is determined.

In some embodiments, after the priority of the data flow sub-queue is determined, the electronic device assigns features to the data flow sub-queue. For example, if the data flow sub-queue is a normal flow queue, the electronic device assigns a blue color and a queue ID of 0 (zero), of 1, of 2, of 3, of 4, or of 5 to the data flow sub-queue. If the data flow sub-queue is a time-sensitive flow queue, the electronic device assigns an orange color and a queue ID of 6 to the data flow sub-queue. If the data flow sub-queue is a strictly time-sensitive flow queue, the electronic device assigns a red color and a queue ID of 7 to the data flow sub-queue.

The normal flow queues may include ordinary Ethernet traffic, audio and video traffic, best effort (BE) traffic, and/or background traffic, etc. The normal flow queues cannot occupy transmission time of other data flow sub-queues. Information of switch port status of switch port corresponding to the normal flow queues may be BIN:001111.1 IDEC: 63.

The time-sensitive flow queues may include low-jitter and low-latency traffic. The time-sensitive flow queues can occupy transmission time of the normal flow queues. Information of switch port status corresponding to the time-sensitive flow queues may be BIN: 01000000DEC: 64.

The strictly time-sensitive flow queues may include low-latency and zero jitter traffic. The strictly time-sensitive flow queues can occupy transmission time of both the time-sensitive flow queues and the normal flow queues. When transmission times of two strictly time-sensitive flow queues overlap, integration of the two does not take place. Information of switch port status corresponding to the strictly time-sensitive flow queue may be BIN: 10000000 DEC: 128.

At block S13, the electronic device integrates the multiple data flow queues into a target data flow queue according to the priority.

In one embodiment, integrating the multiple data flow queues into a target data flow queue according to the priority includes: determining a cycle (i.e., period of time) of each of the multiple data flow queues; calculating a least common multiple of cycles of the multiple data flow queues; and integrating the multiple data flow queues into the target data flow queue according to the least common multiple and the priority.

In one embodiment, integrating the multiple data flow queues into the target data flow queue according to the least mon multiple and the priority includes: adjusting the cycle of each of the multiple data flow queues according to the least common multiple to obtain adjusted data flow queues; and integrating the adjusted data flow queues into the target data flow queue according to the priority.

For example, there are two data flow queues denoted as a first data flow queue and a second data flow queue. A cycle of the first data flow queue is 1200000 ns, and a cycle of the second data flow queue is 600000 ns. A least common multiple of cycles of the first data flow queue and the second data flow queue is 1200000 ns. The cycle of the second data flow queue is adjusted to 1200000 ns to obtain a second adjusted data flow queue. The first data flow queue and the adjusted second data flow queue are integrated into a target data flow queue according to the priority. An efficiency of integrating data flow queues is improved by adjusting the cycles of the data flow queues to a unified cycle.

According to actual requirements, the cycles of the data flow queues and network configuration may be adjusted in real time.

In one embodiment, integrating the multiple data flow queues into a target data flow queue according to the priority includes: obtaining an execution time of each of the one or more data flow sub-queues; and integrating the multiple data flow queues into the target data flow queue according to the priority and the execution time.

For example, the data flow sub-queues include a time-sensitive flow queue and a strictly time-sensitive flow queue, an execution time of the time-sensitive flow queue and an execution time of the strictly time-sensitive flow queue are obtained. If the execution time of the time-sensitive flow queue and the execution time of the strictly time-sensitive flow queue do not overlap, the multiple data flow queues are directly integrated to the target data flow queue. If the execution time of the time-sensitive flow queue and the execution time of the strictly time-sensitive flow queue do overlap, priorities of the time-sensitive flow queue and the strictly time-sensitive flow queue are determined, and the multiple data flow queues are integrated to the target data flow queue according to the priorities. For example, the priority of the strictly time-sensitive flow queue is higher than that of the time-sensitive flow queue, so the strictly time-sensitive flow queues will occupy the transmission time of the time-sensitive flow queue, and the transmission time of the time-sensitive flow queue is delayed, jitter of the time-sensitive flow queue is increased.

In some embodiments, the electronic device may further generate an alarm when execution times of two data flow sub-queues overlap and priorities of the two data flow sub-queues are a same preset priority. The preset priority may be a highest priority of data flow sub-queues.

For example, when a priority of a data flow sub-queue is the highest priority, the data flow sub-queue is without jitter, and there can be no interference. Therefore, if the execution times of the two data flow sub-queues overlap and the priorities of the two data flow sub-queues are both the highest priority, the two data flow sub-queues cannot be integrated, that is, two data flow queues including the two data flow sub-queues cannot be integrated. When the data flow queue cannot be integrated, an alarm can be generated. The alarm can be sent to one or more preset users.

At block S14, the electronic device sends the target data flow queue to a target switch.

The target switch receives the target data flow queue, and executes network configuration according to the target data flow queue. The electronic device may send the target data flow queue using Network Configuration Protocol (NETCONF).

Figure 2:
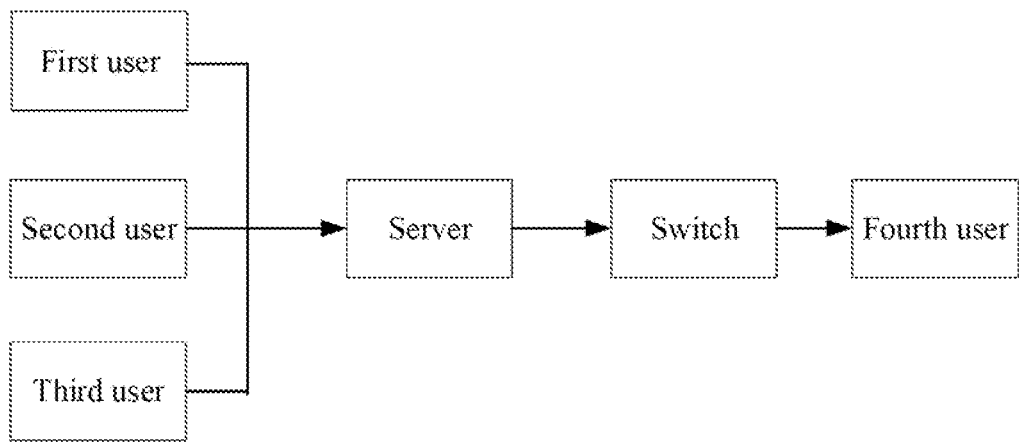
FIG. 2 illustrates an application scenario of the data flow processing method.

In one example with reference to FIG. 2, a first user, a second user, and a third user respectively send a first data flow queue, a second data flow queue, and a third data flow queue to a fourth user at the same time. The electronic device obtains the first data flow queue, the second data flow queue, and the third data flow queue, integrates the first data flow queue, the second data flow queue, and the third data flow queue to a target data flow queue, and sends the target data flow queue to a switch (i.e., target switch) connected to the fourth user.

In some embodiments, sending the target data flow queue to a target switch includes: converting the target data flow queue into a preset format to obtain a traffic profile; and sending the traffic profile to the target switch.

The preset format can be an Extensible Markup Language (XML) format, and the traffic profile may be an XML document.

In some embodiments, the target switch is determined by: determining a source address and a destination address of each of the multiple data flow queues; and determining the target switch according to the source address and the destination address.

The source address may include a source Internet Protocol (IP) address, and the destination address may include a destination IP address. A shortest path may be calculated according to the source IP address and the destination IP address, and the target switch is determined according to the shortest path.

In the data flow processing method, multiple data flow queues are obtained, each of the multiple data flow queues including one or more data flow sub-queues. A priority of each of the one or more data flow sub-queues is determined. The multiple data flow queues are integrated to a target data flow queue according to the priority. The target data flow queue is sent to a target switch. The method integrates data flows as far as possible and improves the efficiency of data flow scheduling.

Figure 3:
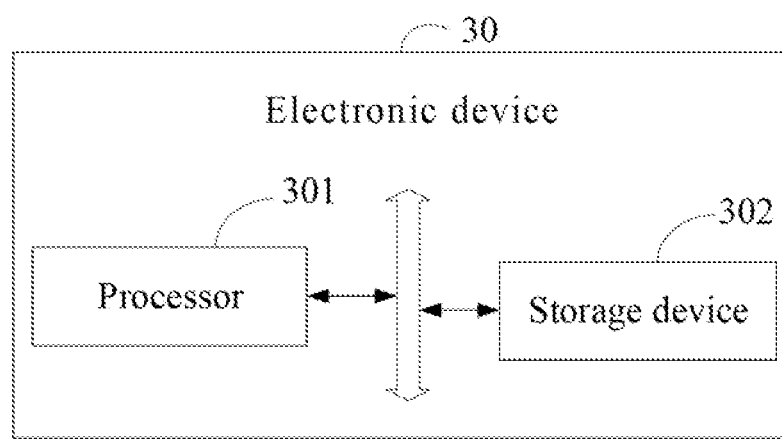
FIG. 3 illustrates an electronic device for data flow processing according to one embodiment of the present disclosure.

FIG. 3 illustrates an electronic device 30 for data flow processing according to one embodiment of the present disclosure. The electronic device 30 can be a server or a terminal device.

The server can be a single server or a server cluster composed of multiple servers. The terminal device can be a mobile phone, a tablet computer, a notebook computer, a desktop computer, a personal digital assistant, a wearable device, or other electronic device.

As shown in FIG. 3, the electronic device 30 includes a processor 301 and a storage device 302 connected through a system bus. The storage device 302 may include a non-volatile storage medium and a volatile storage medium.

The storage device 302 may be used to store program codes and various data of computer programs. For example, the storage device 302 may be used to store a data flow processing system installed in the electronic device 30 and implement completion of storing programs or data during an operation of the electronic device 30.

The processor 301 is a control center of the electronic device 30, and connects various parts of the electronic device 30 using various interfaces and lines.

In one embodiment, the electronic device 30 further includes a network interface, and the network interface is used for network communication, such as sending assigned tasks. Those skilled in the art can understand that the structure shown in FIG. 3 is only a representation of a structure related to the present disclosure, and does not constitute a limitation on the electronic device 30 to which the present disclosure is applied. The electronic device 30 may include more or fewer parts than shown in the figure, or combine some parts, or have a different arrangement of parts.

The processor 301 may be a central processing unit (CPU) or other general-purpose processor, a digital signal processor (DSP), an application specific integrated circuit (ASIC), a field-programmable gate array (FPGA) or other programmable logic device, a discrete gate, or a transistor logic device, or a discrete hardware component, etc. The processor 301 may be a microprocessor or any conventional processor.

In one embodiment, the processor 301 executes computer-readable instructions stored in the storage device 302, to implement the operations: obtaining multiple data flow queues, each of the multiple data flow queues comprising one or more data flow sub-queues; determining a priority of each of the one or more data flow sub-queues; integrating the multiple data flow queues into a target data flow queue according to the priority; and sending the target data flow queue to a target switch.

In one embodiment, integrating the multiple data flow queues into a target data flow queue according to the priority includes: determining a cycle of each of the multiple data flow queues; calculating a least common multiple of cycles of the multiple data flow queues; and integrating the multiple data flow queues into the target data flow queue according to the least common multiple and the priority.

In one embodiment, integrating the multiple data flow queues into the target data flow queue according to the least common multiple and the priority includes: adjusting the cycle of each of the multiple data flow queues according to the least common multiple to obtain adjusted data flow queues; and integrating the adjusted data flow queues into the target data flow queue according to the priority.

In one embodiment, integrating the multiple data flow queues into a target data flow queue according to the priority includes: obtaining an execution time of each of the one or more data flow sub-queues; and integrating the multiple data flow queues into the target data flow queue according to the priority and the execution time.

In one embodiment, the processor 301 further generates an alarm when execution times of two data flow sub-queues overlap and priorities of the two data flow sub-queues are a same preset priority.

In one embodiment, sending the target data flow queue to a target switch includes: converting the target data flow queue into a preset format to obtain a traffic profile; and sending the traffic profile to the target switch.

In one embodiment, the target switch is determined by: determining a source address and a destination address of each of the multiple data flow queues; and determining the target switch according to the source address and the destination address.

In one embodiment, determining a priority of each of the one or more data flow sub-queues includes: obtaining a data identifier corresponding to each of the one or more data flow sub-queues; and determining the priority according to the data identifier.

Details of the processor 301 executing computer-readable instructions stored in the storage device 302 to implement data flow processing can refer to the description of the flow chart of the data flow processing method, which will not be repeated here.

The present disclosure also provides a computer-readable storage medium. The computer-readable storage medium stores a computer program, the computer program includes instructions. The instructions are executed by a processor of an electronic device to implement the data flow processing method.

The computer-readable storage medium may be an internal storage device of the electronic device described above, such as a hard disk or a memory of the electronic device. The computer-readable storage medium may also be an external storage device of the electronic device, such as a plug-in hard disk, a smart memory card (SMC), and a secure digital (SD), a flash card in the electronic device.

The present disclosure is not limited to the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or one device through software or hardware. Words such as "first" and "second" indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

We claim:

1. A data flow processing method, comprising:
    obtaining multiple data flow queues, each of the multiple data flow queues comprising one or more data flow sub-queues;
    determining a priority of each of the one or more data flow sub-queues;

obtaining an execution time of each of the one or more data flow sub-queues;

generating an alarm when execution times of two data flow sub-queues overlap and priorities of the two data flow sub-queues are a preset priority;

integrating the multiple data flow queues into the target data flow queue according to the priority and the execution time; and sending the target data flow queue to a target switch.

2. The data flow processing method according to claim 1, wherein integrating the multiple data flow queues into a target data flow queue according to the priority comprises:

determining a cycle of each of the multiple data flow queues;

calculating a least common multiple of cycles of the multiple data flow queues; and integrating the multiple data flow queues into the target data flow queue according to the least common multiple and the priority.

3. The data flow processing method according to claim 2, wherein integrating the multiple data flow queues into the target data flow queue according to the least common multiple and the priority comprises:

adjusting the cycle of each of the multiple data flow queues according to the least common multiple to obtain adjusted data flow queues; and integrating the adjusted data flow queues into the target data flow queue according to the priority.

4. The data flow processing method according to claim 1, wherein sending the target data flow queue to a target switch comprises:

converting the target data flow queue into a preset format to obtain a traffic profile; and sending the traffic profile to the target switch.

5. The data flow processing method according to claim 4, wherein the target switch is determined by:

determining a source address and a destination address of each of the multiple data flow queues; and determining the target switch according to the source address and the destination address.

6. The data flow processing method according to claim 1, wherein determining a priority of each of the one or more data flow sub-queues comprises:

obtaining a data identifier corresponding to each of the one or more data flow sub-queues; and determining the priority according to the data identifier.

7. An electronic device comprising:

at least one processor; and a storage device storing computer-readable instructions, which when executed by the at least one processor, cause the at least one processor to:

obtain multiple data flow queues, each of the multiple data flow queues comprising one or more data flow sub-queues;

determine a priority of each of the one or more data flow sub-queues;

obtain an execution time of each of the one or more data flow sub-queues;

generate an alarm when execution times of two data flow sub-queues overlap and priorities of the two data flow sub-queues are a preset priority, integrate the multiple data flow queues into the target data flow queue according to the priority and the execution time; and send the target data flow queue to a target switch.

8. The electronic device according to claim 7, wherein the at least one processor is further caused to:

determine a cycle of each of the multiple data flow queues;

calculate a least common multiple of cycles of the multiple data flow queues; and integrate the multiple data flow queues into the target data flow queue according to the least common multiple and the priority.

9. The electronic device according to claim 8, wherein the at least one processor is further caused to:

adjust the cycle of each of the multiple data flow queues according to the least common multiple to obtain adjusted data flow queues; and integrate the adjusted data flow queues into the target data flow queue according to the priority.

10. The electronic device according to claim 7, wherein the at least one processor is further caused to:

convert the target data flow queue into a preset format to obtain a traffic profile; and send the traffic profile to the target switch.

11. The electronic device according to claim 10, wherein the at least one processor is further caused to:

determine a source address and a destination address of each of the multiple data flow queues; and determine the target switch according to the source address and the destination address.

12. A non-transitory storage medium having instructions stored thereon, when the instructions are executed by a processor of an electronic device, the processor is configured to perform a data flow processing method, the method comprising:

obtaining multiple data flow queues, each of the multiple data flow queues comprising one or more data flow sub-queues;

determining a priority of each of the one or more data flow sub-queues;

obtaining an execution time of each of the one or more data flow sub-queues;

generating an alarm when execution times of two data flow sub-queues overlap and priorities of the two data flow sub-queues are a preset priority;

integrating the multiple data flow queues into the target data flow queue according to the priority and the execution time; and sending the target data flow queue to a target switch.

13. The non-transitory storage medium according to claim 12, wherein integrating the multiple data flow queues into a target data flow queue according to the priority comprises:

determining a cycle of each of the multiple data flow queues;

calculating a least common multiple of cycles of the multiple data flow queues; and integrating the multiple data flow queues into the target data flow queue according to the least common multiple and the priority.

14. The non-transitory storage medium according to claim 13, wherein integrating the multiple data flow queues into the target data flow queue according to the least common multiple and the priority comprises:

adjusting the cycle of each of the multiple data flow queues according to the least common multiple to obtain adjusted data flow queues; and integrating the adjusted data flow queues into the target data flow queue according to the priority.

15. The non-transitory storage medium according to claim 12, wherein sending the target data flow queue to a target switch comprises:

converting the target data flow queue into a preset format to obtain a traffic profile; and sending the traffic profile to the target switch.

16. The non-transitory storage medium according to claim 15, wherein the target switch is determined by:

determining a source address and a destination address of each of the multiple data flow queues; and determining the target switch according to the source address and the destination address.

* * * * *